US010627907B2

(12) United States Patent
Venkatesan et al.

(10) Patent No.: US 10,627,907 B2
(45) Date of Patent: *Apr. 21, 2020

(54) POSITION CONTROL OF A USER INPUT ELEMENT ASSOCIATED WITH A HAPTIC OUTPUT DEVICE

(71) Applicant: Immersion Corporation, San Jose, CA (US)

(72) Inventors: Srivatsav Venkatesan, Sunnyvale, CA (US); Kaniyalal Shah, Fremont, CA (US); Douglas George Billington, Campbell, CA (US); Aaron Kapelus, Jamaica Plain, MA (US); Stephen Rank, San Jose, CA (US); Daniel Parker, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,399

(22) Filed: Aug. 8, 2018

(65) Prior Publication Data
US 2019/0041990 A1    Feb. 7, 2019

Related U.S. Application Data

(63) Continuation of application No. 14/979,321, filed on Dec. 22, 2015, now Pat. No. 10,073,523.

(Continued)

(51) Int. Cl.
*A63F 13/00*    (2014.01)
*G06F 3/01*    (2006.01)
(Continued)

(52) U.S. Cl.
CPC ............ *G06F 3/016* (2013.01); *A63F 13/218* (2014.09); *A63F 13/23* (2014.09); *A63F 13/285* (2014.09); *A63F 13/42* (2014.09)

(58) Field of Classification Search
None
See application file for complete search history.

(56) References Cited

U.S. PATENT DOCUMENTS

| | | | | |
|---|---|---|---|---|
| 6,020,876 A | * | 2/2000 | Rosenberg | G06F 3/011 345/157 |
| 6,184,868 B1 | * | 2/2001 | Shahoian | A63F 13/06 345/161 |

(Continued)

FOREIGN PATENT DOCUMENTS

| JP | 2008000345 A | 1/2008 |
|---|---|---|
| JP | 2008015679 A | 1/2008 |

(Continued)

OTHER PUBLICATIONS

Anonymous: "Getting Started With XInput", Dec. 16, 2014 (Dec. 16, 2014), XP055458537, retrieved from the Internet: URL:https://web.archive.org/web/20141216120515/http://msdn.microsoft.com:80/en-us/library/windows/desktop/ee417001(v=vs.85).aspx [retrieved on Mar. 12, 2018] p. 1-3.

(Continued)

*Primary Examiner* — Paul A D'Agostino
(74) *Attorney, Agent, or Firm* — Medler Ferro Woodhouse & Mills PLLC

(57) ABSTRACT

Systems and methods for rendering a haptic effect at a user input element associated with a haptic output device are provided. A primary range and a secondary range of positions are defined for the user input element associated with the haptic output device. In addition, a boundary range of positions is defined for the user input element associated with the haptic output device, the boundary range partially overlapping each of the primary and secondary ranges. A position of the user input element is monitored, and the (Continued)

haptic effect rendered in response to an entry of the user input element to positions within the boundary range.

20 Claims, 10 Drawing Sheets

Related U.S. Application Data

(60) Provisional application No. 62/096,251, filed on Dec. 23, 2014.

(51) Int. Cl.
*A63F 13/285* (2014.01)
*A63F 13/23* (2014.01)
*A63F 13/42* (2014.01)
*A63F 13/218* (2014.01)

(56) References Cited

U.S. PATENT DOCUMENTS

| 7,490,530 | B2 | 2/2009 | Ishikawa et al. |
| 8,622,833 | B2 | 1/2014 | Kake |
| 9,778,743 | B2 | 10/2017 | Grant et al. |
| 2005/0156892 | A1 | 7/2005 | Grant |
| 2006/0142657 | A1* | 6/2006 | Quaid ............... A61B 17/1703 600/424 |
| 2006/0290662 | A1* | 12/2006 | Houston ............... A63F 13/06 345/156 |
| 2011/0118032 | A1 | 5/2011 | Zalewski |
| 2011/0260990 | A1* | 10/2011 | Ali ..................... G06F 3/016 345/173 |
| 2014/0043228 | A1 | 2/2014 | Grant et al. |
| 2014/0315642 | A1 | 10/2014 | Grant et al. |
| 2014/0320406 | A1 | 10/2014 | Nishizawa |
| 2015/0130706 | A1 | 5/2015 | Lacroix et al. |

FOREIGN PATENT DOCUMENTS

| JP | 2014215850 A | 11/2014 |
| JP | 2014216017 A | 11/2014 |

OTHER PUBLICATIONS

Any information that are not included with this Information Disclosure Statement can be found in U.S. Appl. No. 14/979,321.

* cited by examiner

300

500

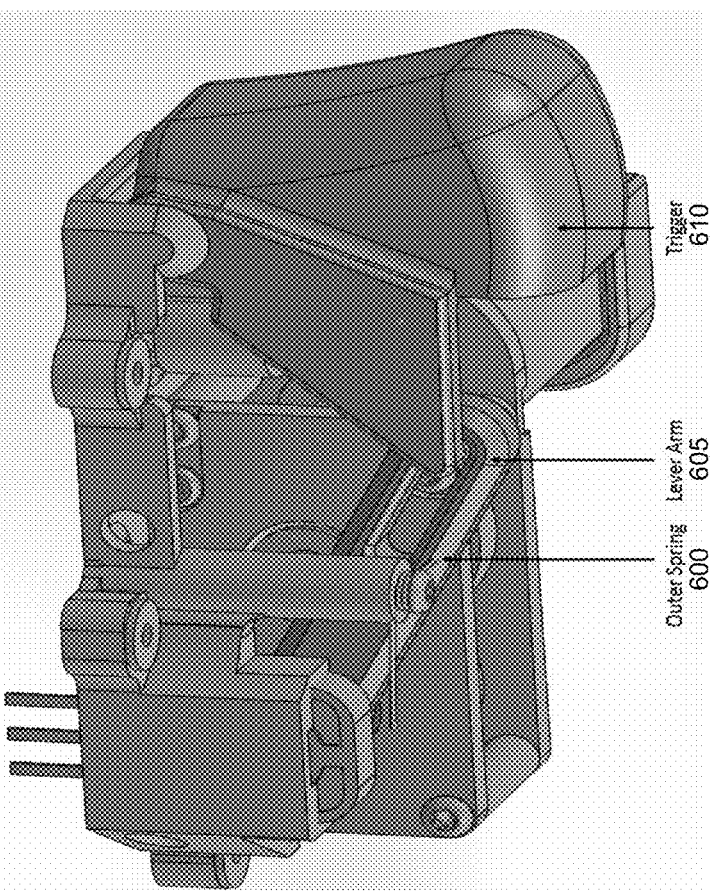
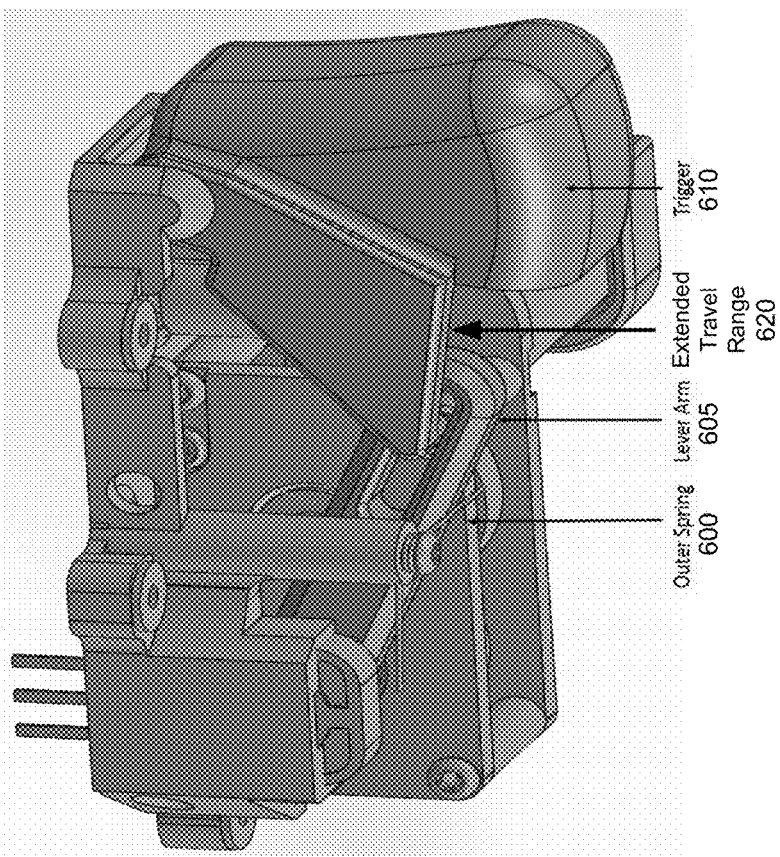
Fig. 6

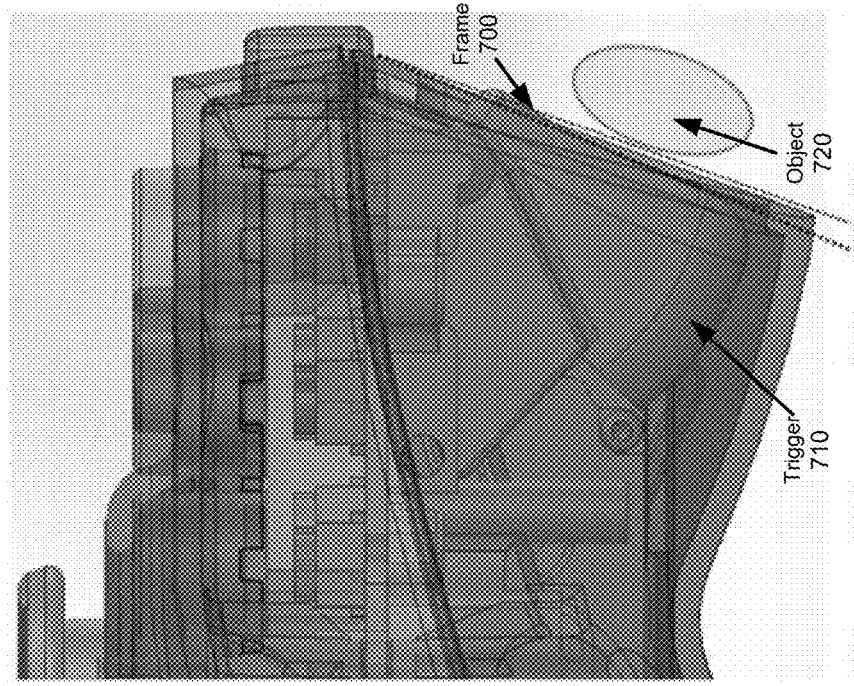
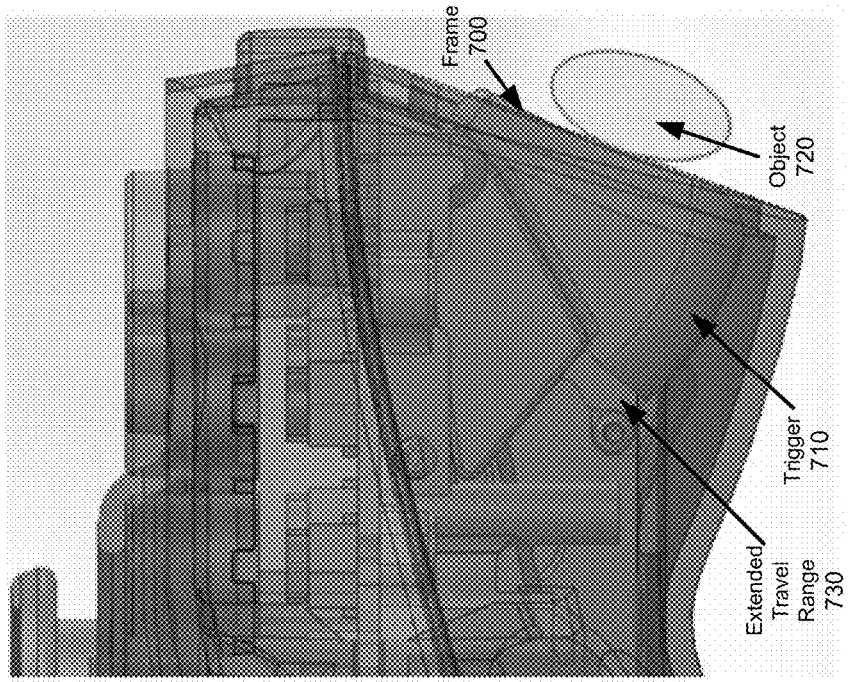
Fig. 7

POSITION CONTROL OF A USER INPUT ELEMENT ASSOCIATED WITH A HAPTIC OUTPUT DEVICE

PRIORITY APPLICATION

This application is a continuation of U.S. patent application Ser. No. 14/979,321, filed on Dec. 22, 2015, which claims the benefit of U.S. Provisional Patent Application No. 62/096,251, filed on Dec. 23, 2014, both of which have been incorporated herein by reference in their entirety.

FIELD OF INVENTION

The embodiments are generally directed to electronic devices, and more particularly, to electronic devices that produce haptic effects.

BACKGROUND

Video games and video game systems have become extremely popular. Video game devices or controllers typically use visual and auditory cues to provide feedback to a user. In some interface devices, kinesthetic feedback (e.g., active and resistive force feedback) and/or tactile feedback (e.g., vibration, texture, temperature variation, and the like) may be provided to the user. In general, such feedback is collectively known as "haptic feedback" or "haptic effects." Haptic feedback provides cues that enhance and simplify a user's interaction with a video game controller, or other electronic device. For example, haptic effects may provide cues to users of video game controllers or other electronic devices to alert the user to specific events, or provide realistic feedback to create greater sensory immersion within a simulated or virtual environment.

Other devices in which a user interacts with a user input element to cause an action also may benefit from haptic feedback or haptic effects. For example, such devices may include medical devices, automotive controls, remote controls, and other similar devices.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example, functionality for rendering a haptic effect at a user input element associated with a haptic output device is provided. A primary range and a secondary range of positions are defined for the user input element associated with the haptic output device. In addition, a boundary range of positions is defined for the user input element associated with the haptic output device, the boundary range partially overlapping each of the primary and secondary ranges. A position of the user input element is monitored, and the haptic effect is rendered in response to an entry of the user input element to positions within the boundary range.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 6 illustrates a controller that includes an outer spring that creates an open extended travel range for a trigger to move within when the trigger is in a maximum open position outside of the open extended travel range, according to an example embodiment of the present invention.

FIG. 7 illustrates a controller that includes an extended frame that that creates a closed extended travel range for a trigger to move within when the trigger is in a maximum closed position outside of the closed extended travel range, according to an example embodiment of the invention.

DETAILED DESCRIPTION

Example embodiments are directed toward systems and methods for controlling a boundary range of a user input element associated with a haptic output device. For example, a haptic effect may be rendered when the user input element is positioned in the boundary range. The boundary range of positions is defined for the user input element so as to partially overlap each of a primary and secondary range of positions. As the position of the user input element is monitored, the haptic effect may be rendered in response the user input element entering positions within the boundary range.

In the various embodiments, a variety of user interfaces and methods for using a device are described. In some embodiments, the device is a portable electronic device (e.g., a game controller, console, mobile phone, smartphone, tablet, etc.). It should be understood, however, that the user interfaces and associated methods may be applied to numerous other devices, such as personal computers, medical devices, laptops, and the like that may include one or more other physical user-interface devices, such as a keyboard, mouse, trackball and the like.

Figure 1:
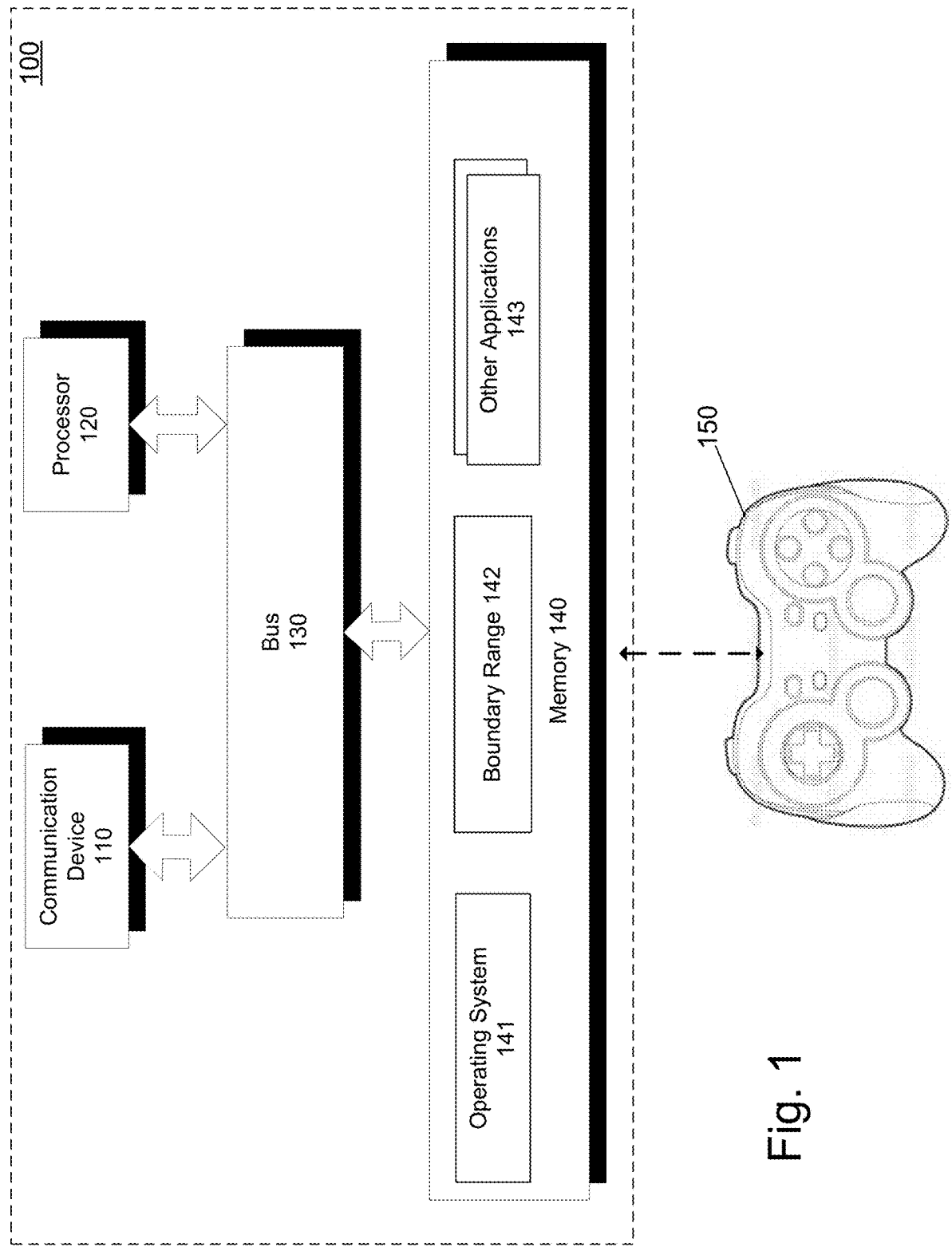
FIG. 1 illustrates a block diagram of a system according to an example embodiment of the present invention.

FIG. 1 illustrates a block diagram of a system 100 according to an example embodiment of the present invention.

System 100 may include a communication device 110 configured to transmit and/or receive data from remote sources. Communication device 110 may enable connectivity between a processor 120 and other devices by encoding data to be sent from processor 120 to another device over a network (not shown) and decoding data received from another system over the network for processor 120.

For example, communication device 110 may include a network interface card that is configured to provide wireless network communications. A variety of wireless communication techniques may be used including infrared, radio, Bluetooth, Wi-Fi, and/or cellular communications. Alternatively, communication device 110 may be configured to provide wired network connection(s), such as an Ethernet connection.

Processor 120 may comprise one or more general or specific purpose processors to perform computation and control functions of system 100. Processor 120 may include a single integrated circuit, such as a micro-processing device, or may include multiple integrated circuit devices and/or circuit boards working in cooperation to accomplish the functions of processor 120. In addition, processor 120 may execute computer programs, such as an operating system 141, boundary range module 142, and other applications 143, stored within memory 140.

System 100 may include memory 140 for storing information and instructions for execution by processor 120. Memory 140 may contain various components for retrieving, presenting, modifying, and storing data. For example, memory 140 may store software modules that provide functionality when executed by processor 120. The modules may include operating system 141 that provides operating system functionality for system 100. The modules may further include the boundary range module 142 that controls the boundary range of user input elements of controller 150. For example, boundary range module 142 may monitor the position of user input elements and render haptic effects in response the user input elements entering positions within respective boundary ranges. System 100 also may include one or more additional application modules 143 that include additional functionality, such as peripheral firmware configured to provide control functionality for a peripheral device, such as controller 150 (e.g., a gamepad, wearable device, etc.).

Non-transitory memory 140 may include a variety of computer-readable media that may be accessed by processor 120. In the various embodiments, memory 140 may include volatile and nonvolatile media, removable and non-removable media. For example, memory 140 may include any combination of random access memory ("RAM"), dynamic RAM ("DRAM"), static RAM ("SRAM"), read only memory ("ROM"), flash memory, cache memory, and/or any other type of non-transitory computer-readable media. Alternatively, or additionally, memory 140 may include one or more network or cloud accessible storage media.

Although shown as a single system, the functionality of system 100 may be implemented as a distributed system. For example, memory 140 and processor 120 may be distributed across multiple different computers that collectively comprise system 100. In one embodiment, system 100 may be part of a device (e.g., personal computer, console, video game console, etc.), and system 100 provides haptic effect functionality for the device. In another embodiment, system 100 may be separate from the device, and may remotely provide the aforementioned functionality for the device.

System 100 may be operably connected to controller 150. Controller 150 may be a peripheral device configured to provide input to the system 100. Controller 150 may be operably connected to system 100 using either a wireless connection or a wired connection. Controller 150 also may include a local processor configured to communicate with system 100 using either a wireless connection or a wired connection. Alternatively, controller 150 may be configured to not include a local processor, and all input signals and/or output signals associated with controller 150 may be processed by the components of system 100. In embodiments in which controller 150 has a local processor, additional functionality, such as boundary range modules and peripheral firmware configured to provide control functionality may reside within controller 150.

Controller 150 may further include one or more digital buttons, one or more analog buttons, one or more bumpers, one or more directional pads, one or more analog or digital sticks, one or more driving wheels, and/or one or more user input elements that can be interacted with by a user, and that can provide input to system 100. Controller 150 may also include one or more analog or digital trigger buttons (or "triggers") that can further be interacted with by the user, and that can further provide input to system 100. As is described below in greater detail, controller 150 can further include a motor, or another type of actuator or haptic output device, configured to exert a bi-directional push/pull force on at least one trigger of controller 150.

Controller 150 can also include one or more actuators, or other types of haptic output devices. The local processor of controller 150, or processor 120 in embodiments where controller 150 does not include a local processor, may transmit a haptic signal associated with a haptic effect to at least one actuator of controller 150. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, or trigger) of controller 150. Alternatively, the haptic effects can be experienced at an outer surface of controller 150.

An actuator is an example of a haptic output device, where a haptic output device is a device configured to output haptic effects, such as vibrotactile haptic effects, electrostatic friction haptic effects, temperature variation, and/or deformation haptic effects, in response to a drive signal. In alternate embodiments, the one or more actuators within controller 150 can be replaced by some other type of haptic output device. The haptic output device may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some instances, the haptic output device may include haptic output drive circuit. In some embodiments, the haptic output device may be unidirectional or bidirectional.

Controller 150 may further include one or more speakers. The local processor of controller 150, or processor 120 in embodiments where controller 150 does not include a local processor, may transmit an audio signal to at least one speaker of controller 150, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 150 can further include one or more sensors. A sensor may be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor may further be configured to convert the detected energy, or other physical property, into an electrical signal, or any signal that represents virtual sensor information, and controller 150 can send the converted signal to the local processor of controller 150, or processor 120 in embodiments where controller 150 does not include a local processor.

Figure 2:
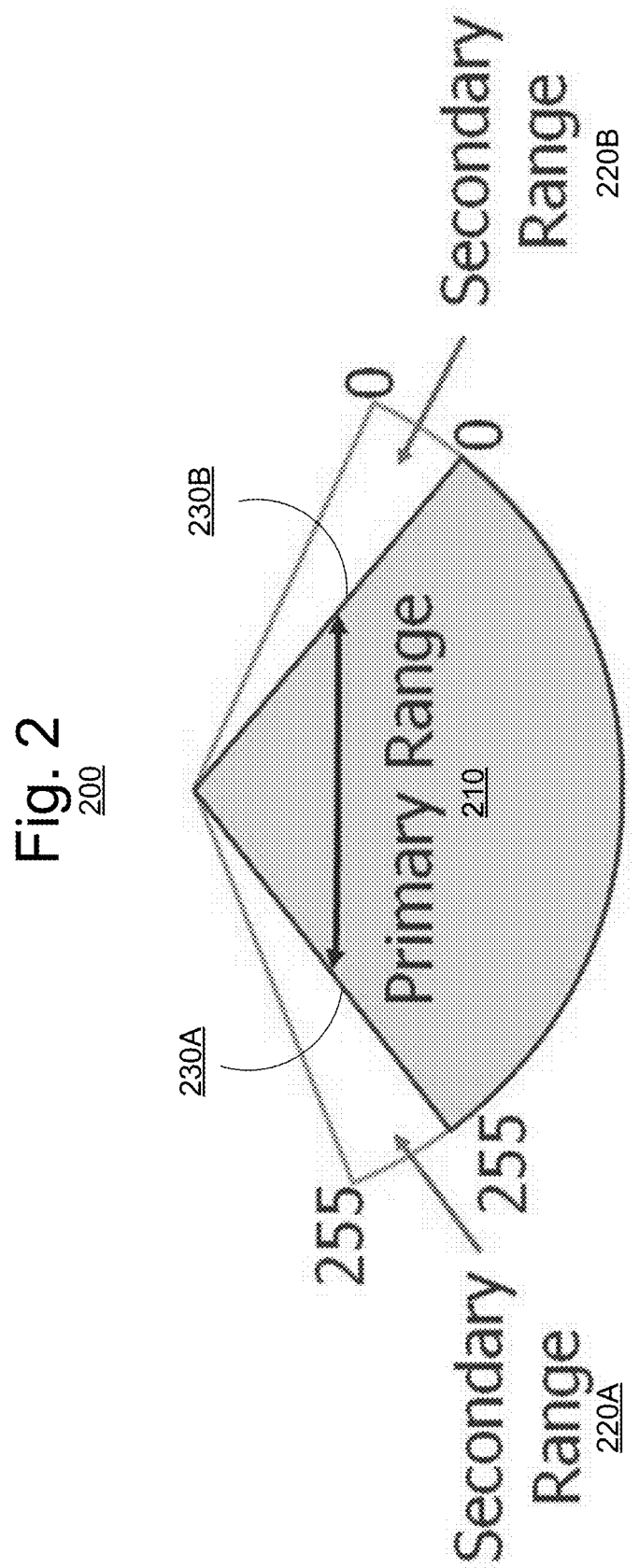
FIG. 2 is a simplified schematic illustrating a range of motion for a user input element according to an example embodiment of the present invention.

FIG. 2 is a simplified schematic illustrating a range of motion 200 for a user input element according to an example embodiment of the present invention. Although range of motion 200 relates to a trigger input element, the embodiments of the invention may be readily applied to a variety of user input element types.

As shown in FIG. 2, range of motion 200 may include a primary range 210 and secondary ranges 220A, 220B. In addition, boundary ranges 230A, 230B may be defined so as to partially overlap primary range 210 and secondary ranges 220A, 220B. In some instances, primary range 210 may be extended to render haptic effects within secondary ranges 220A, 220B and/or boundary ranges 230A, 230B. For example, the user input elements may be pulled further in and/or pushed further out while haptic output devices render the haptic effects.

In some embodiments, primary range 210 and secondary ranges 220A, 220B may be fixed or variable. For example, secondary range 220A may have a range of motion of 7 degrees from a maximum outward position to a nominal position, primary range 210 may have a range of motion of 29 degrees from the nominal position to a finger grounding position, and secondary range 220B may have a range of motion of 3 degrees from the finger grounding position to a trigger grounding position. In this example, range of motion 200 may total 39 degrees (7+29+3).

When no haptic effect is being applied, movement of the user input element may be limited to primary range 210. However, when haptic effects are applied, movement of the user input element may be extended to secondary ranges 220A, 220B and/or boundary ranges 230A, 230B. In either case, the position of the user input element may be represented as analog to digital conversion ("ADC") data, such as 8 bit ADC data having a range of values between 0 and 255. Although 8 bit position data is provided as an example, the embodiments are not so limited. Higher resolution position data, such as 16 bit position data, may also be used.

Figure 3:
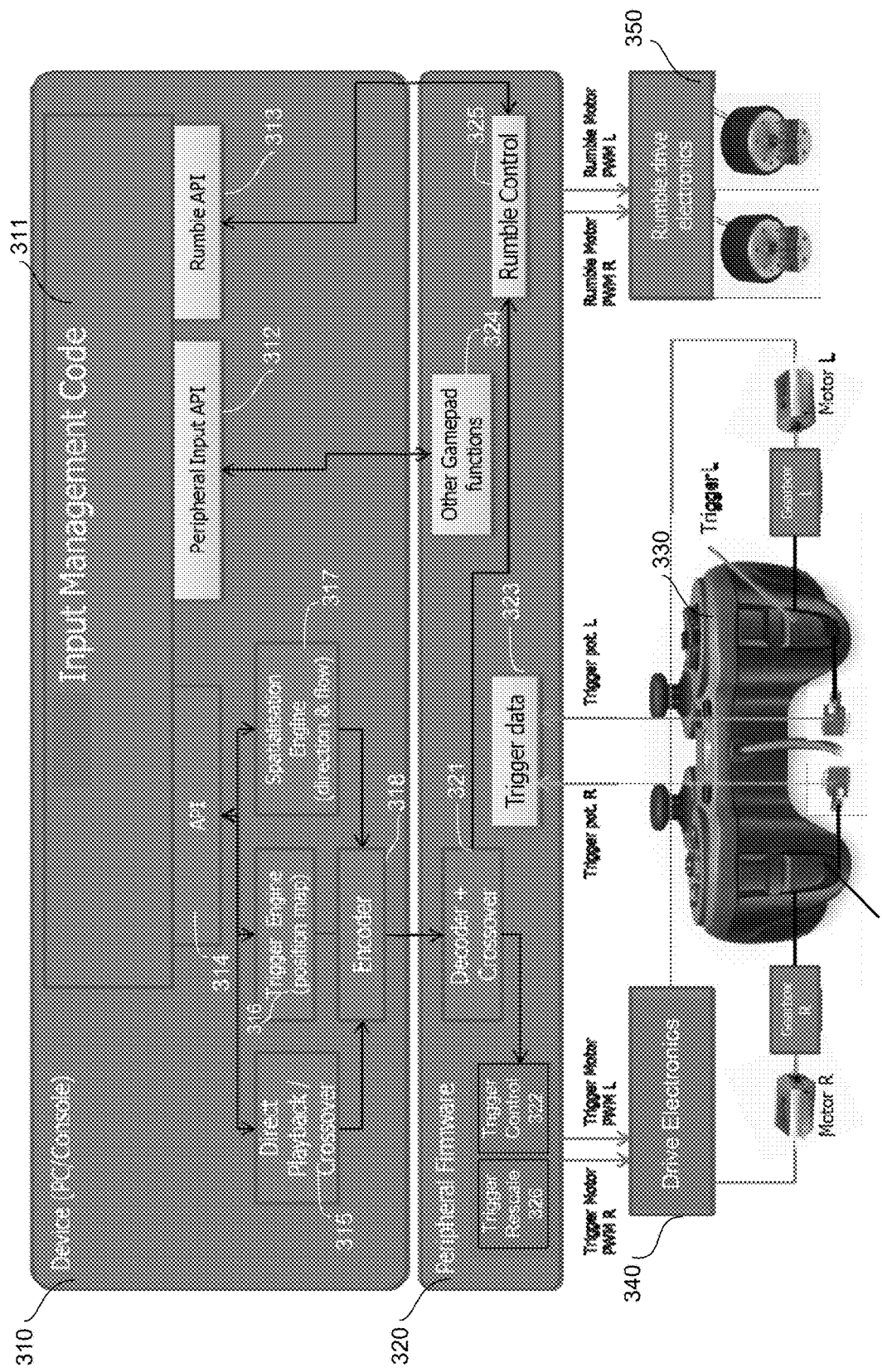
FIG. 3 illustrates a block diagram of a haptic effect software stack according to an example embodiment of the present invention.

FIG. 3 illustrates a block diagram of a haptic effect software stack 300 according to an example embodiment of the present invention. As shown in FIG. 3, software stack 300 includes device modules 310, peripheral firmware modules 320, controller modules 330, drive modules 340, and rumble drive modules 350. Haptic effect software stack 300 is implemented on a system, such as system 100 of FIG. 1.

Device modules 310 may include a variety of modules such as input management code 311, peripheral input application programming interface ("API") 312, rumble API 313, haptic effect API 314, direct playback/crossover 315, trigger engine 316, spatialization engine 317, and encoder 318.

Input management code 311 may include a set of computer-readable instructions that manage input provided by controller 330 in the context of a game application, or other type of application, executed within a device.

Peripheral input API 312 may include a set of computer-readable functions or routines that enable game input management code 311 to interact with peripheral firmware 320 in order to receive and manage input provided by controller 330.

Rumble API 313 may include a set of computer-readable functions or routines that enable input management code 311 to interact with peripheral firmware 320 in order to transmit rumble instructions to one or more rumble motors or rumble actuators of controller 330 (e.g., rumble motors L and R of FIG. 3). In addition, a rumble instruction may cause a rumble motor or rumble actuator of controller 330 to produce a general or rumble haptic effect.

Haptic effect API 314 (identified in FIG. 3 as "API") may include a set of computer-readable functions or routines that are accessible to input management code 311, and that enable input management code 311 to interact with peripheral firmware 320 in order to transmit haptic instructions to controller 330. In addition, a haptic instruction may cause one or more targeted motors or targeted actuators of controller 330 to produce a haptic effect at one or more user input elements of controller 330.

Haptic effect API 314 also may store one or more haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 330. The haptic data can include one or more attributes of the corresponding haptic effect, where the attributes can be stored as parameters. Example parameters of a haptic effect definition may include an amplitude parameter, a frequency parameter, a waveform parameter, an envelope parameter, a magnitude (or strength) parameter, and a duration parameter.

Haptic effect API 314 may enable game input management code 311 to interact with direct playback/crossover 315, trigger engine 316, and spatialization engine 317, and may further manage direct playback/crossover 315, trigger engine 316, and spatialization engine 317 according to requests invoked by game input management code 311. Further, haptic effect API 314 may store data used for communication with peripheral firmware 320, and used for generation of one or more haptic effects.

Direct playback/crossover 315 may receive haptic data as input, produce haptic data as output, and transmit haptic data to one or more targeted motors, or targeted actuators, of controller 330 (e.g., motors L and R of FIG. 3). In some embodiments, direct playback/crossover 315 may output the input haptic data directly, without modifying a format of the input haptic data. This results in an "as-is" playback of the input haptic data. In other embodiments, direct playback/crossover 315 may convert the haptic data that is input from a first format to a second format, and can further output the converted haptic data. Depending on the type of playback, direct playback/crossover 315 may optionally use a programmable crossover to convert the haptic data. By converting the haptic data, device modules may deconstruct the haptic effect and playback the haptic effect at multiple actuators.

The format of the haptic data may be a haptic elementary stream ("HES") format. A HES format is a file or data format for representing haptic data that may be streamed to a device. The haptic data can be represented in a manner that is identical or similar to how uncompressed sound is represented, although the haptic data can be encrypted within the HES format.

Trigger engine 316 may receive haptic data, such as a haptic effect definition, and may modify the haptic data based on user input data, such as trigger data 323. Trigger data is data that includes one or more parameters that indicate a position and/or range of one or more triggers of controller 330 (e.g., triggers L and R of FIG. 3). Trigger engine 316 may further transmit haptic instructions to controller 330. For example, trigger engine 316 may transmit haptic instructions to a variety of user-input elements of controller 330. As previously described, a haptic instruction may cause one or more targeted motors or targeted actuators of controller 330 to produce a haptic effect at one or more user-input elements of controller 330.

Spatialization engine 317 may receive haptic data and may modify the haptic data based on spatialization data. Spatialization data may include data that indicates a desired direction and/or flow of a haptic effect, such as an ordering of haptic effects on respective user input elements. In certain embodiments, spatialization engine 317 may receive spatialization data that includes a direction and/or flow from input management code 311.

Spatialization engine 317 may modify the haptic data so that a haptic effect, such as a trigger haptic effect, is scaled for one or more rumble motors, or rumble actuators, of controller 330 (e.g., rumble motors L and R of FIG. 3), and that the haptic effect is also scaled for one or more targeted motors, or targeted actuators, of controller 330 (e.g., motors L and R, as illustrated in FIG. 3). In other words, spatialization engine 317 may modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 317 may scale one or more portions of the haptic effect. For example, spatialization engine 317 may scale haptic data that is sent to the motor or actuator that causes the haptic effect to be experienced, causing the haptic effect to be more pronounced (e.g., increased magnitude, duration, etc.). Additionally, spatialization engine 317 may scale haptic data that is sent to other motors or actuators, causing other haptic effects that are experienced at those motors or actuators to be less pronounced (e.g., decreased magnitude, duration, etc.). In some embodiments, spatialization engine 317 may modify the haptic data in real-time or substantially in real time. Further, in some embodiments, spatialization engine 317 may have non-linear relationships between inputs and motor, or actuator, outputs in order to exaggerate an overall haptic effect.

Encoder 318 encodes haptic data received from direct playback/crossover 315, trigger engine 316, and/or spatialization engine 317 into a format. In one embodiment, the format may be an HES format. Encoder 318 may transmit the encoded haptic data to peripheral firmware 320.

Peripheral firmware 320 is firmware for one or more peripheral devices (e.g., controllers). Peripheral firmware 320 may include a variety of modules such as decoder and crossover 321, trigger control 322, trigger data 323, other functions 324, and rumble control 325.

Decoder and crossover 321 may receive the encoded haptic data from encoder 318 and decodes the encoded haptic data. In some embodiments, decoder and crossover 321 computes a programmable crossover in order to decode the encoded haptic data. Decoder and crossover 321 may compute the programmable crossover in real-time.

Trigger control 322 is a low-level control API for one or more targeted motors or targeted actuators of controller 330 (e.g., motors L and R of FIG. 3). Trigger control 322 may receive a trigger instruction and may convert the trigger instruction into a low-level trigger instruction for a specified targeted motor or targeted actuator of controller 330, and may transmit the low-level trigger instruction to the specified targeted motor or targeted actuator of controller 330. The low-level trigger instruction may cause the specified targeted motor or targeted actuator to produce a trigger haptic effect at a specified trigger of controller 330.

Trigger data 323, as previously described, is data that includes one or more parameters that indicate a position and/or range of one or more triggers of controller 330 (e.g., triggers L and R of FIG. 3). Trigger data 323 may be received from controller 330 by peripheral firmware 320. Peripheral firmware 320 may further store trigger data 323, and may further transmit trigger data 323 to device modules 310.

Other gamepad functions 324 may be functions of controller 330 managed by peripheral firmware 320. Such functions may include such functions as wired/wireless communications, input reporting, protocol implementation, power management, etc.

Rumble control 325 is a low-level control API for one or more rumble motors or rumble actuators of controller 330 (e.g., rumble motors L and R of FIG. 3). Rumble control 325 may receive a rumble instruction, may convert the rumble instruction into a low-level rumble instruction for a specified rumble motor or rumble actuator of controller 330, and may transmit the low-level trigger instruction to the specified rumble motor or rumble actuator of controller 330.

Trigger rescale module 326 is a modular firmware module that monitors the positions of user input elements and the status of their respective haptic output devices in controller 330. For example, trigger rescale module 326 rescales the user inputs to a range expected by the host device. In some instances, trigger rescale module 326 may rescale the user inputs to a range [0,127]. In other instances, trigger rescale module 326 may rescale the user inputs to a range [0,255]. In the various configurations, trigger rescale module 326 may be applied to any analog input. In some instances, sections of firmware that are hardware independent may be separated from the sections that are hardware dependent. Here, hardware independent firmware may interact with the hardware dependent firmware by using function pointers.

Controller 330 may include triggers L and R. Controller 330 may further include gear boxes L and R and motors L and R. Motor L and gearbox L are operably coupled to trigger L within controller 330. Likewise, motor R and gearbox R are operably coupled to trigger R within controller 330. When motor L receives a trigger instruction, motor L and gearbox L may collectively cause a trigger haptic effect to be experienced at trigger L. Likewise, when motor R receives a trigger instruction, motor R and gearbox R may collectively cause a trigger haptic effect to be experienced at trigger R. Peripheral firmware 320 may send trigger instructions to motors L and R of controller 330 using drive electronics 340.

Controller 330 may further include potentiometers L and R. Potentiometer L may detect a position and/or range of trigger L, and may further send the detected position and/or range of trigger L to peripheral firmware 320 as trigger data. Likewise, potentiometer R may detect a position and/or range of trigger R, and may further send the detected position and/or range of trigger R to peripheral firmware 320 as trigger data.

Controller 330 may further include rumble motors L and R. When rumble motor L receives a rumble instruction, rumble motor L causes a haptic effect to be experienced along a left component of controller 330. Likewise, when rumble motor R receives a rumble instruction, rumble motor R causes a haptic effect to be experienced along a right component of controller 330. Peripheral firmware 320 may send rumble instructions to rumble motors L and R using rumble drive electronics 350.

Figure 4:
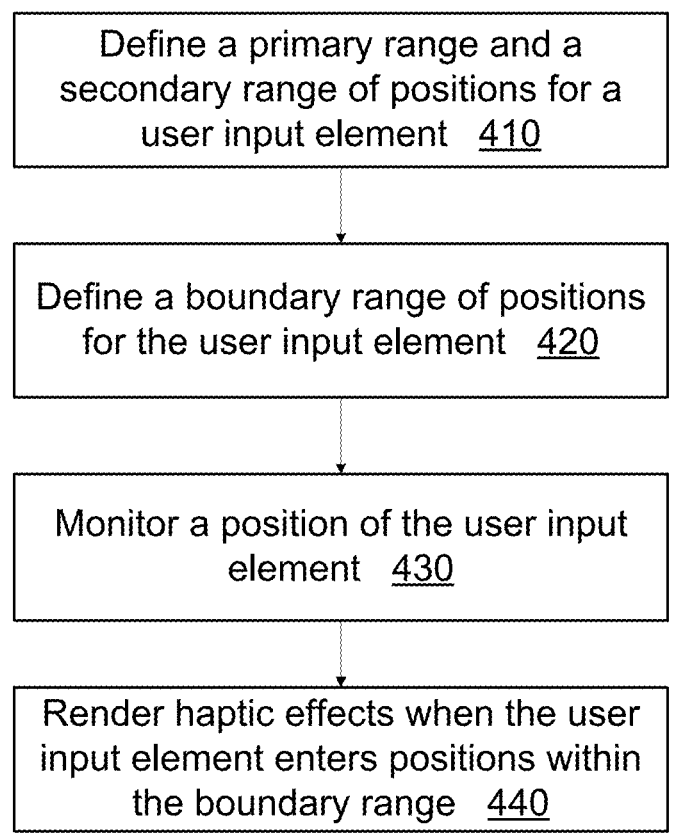
FIG. 4 illustrates a flow diagram of functionality for controlling a user input element associated with a haptic output device according to an example embodiment of the present invention.

FIG. 4 illustrates a flow diagram of functionality 400 for controlling a user input element associated with a haptic output device according to an example embodiment of the present invention. In some instances, the functionality of the flow diagram of FIG. 4 (and FIG. 5 below) may be implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 400 may define a primary range and a secondary range of positions for the user input element associated with the haptic output device, at 410. Next, at 420, functionality 400 may define a boundary range of positions for the user input element associated with the haptic output device, the boundary range partially overlapping each of the primary and secondary ranges. After the various ranges are defined, functionality 400 monitors the position of the user input element, at 430. Lastly, haptic effect(s) may be rendered when the user input element enters positions within the boundary range, at 440. Here, the haptic effect(s) may extend the position of the user input element into one of the secondary ranges. In addition, haptic instructions to render the haptic effect(s) may be generated by a software application, such as a gaming application. By employing functionality 400, the range and capabilities of the user input elements are extended, and a wider range of haptic effects can be experienced by an end user.

Figure 5:
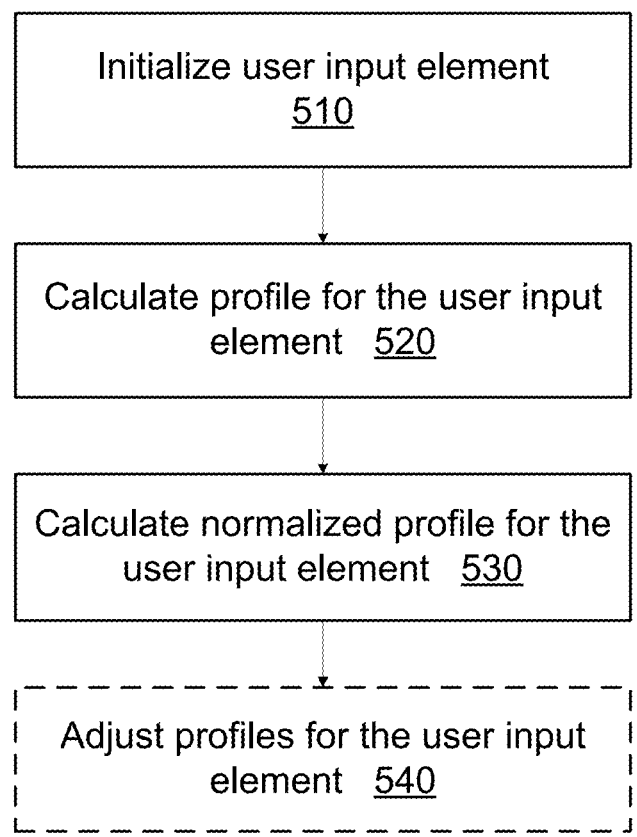
FIG. 5 illustrates a flow diagram of functionality for controlling a user input element associated with a haptic output device according to another example embodiment of the present invention.

FIG. 5 illustrates a flow diagram of functionality 500 for controlling a user input element associated with a haptic output device according to another example embodiment of the present invention.

At the outset, the user input elements of the controller may be initialized, at 510. Here, functionality 500 may initially set position and range information for the user input elements. For example, primary range, secondary range(s), and boundary range(s) may be initially set. In some instances, these values may be calculated based on the movement of the user input device from the maximum out position to the grounding position.

Next, functionality 500 calculates profiles for the user input elements, at 520. The calculated profiles may map each position of the user input device to an ADC value. For example, the calculated profiles of 520 may map each position of the user input device to an ADC value between 0 and 255.

The calculated profiles may utilize either an increasing or a decreasing profile. For example, an increasing profile will produce a value [0,255] when the position of the user input value is read from 8 bit ADC data. Similarly, a decreasing profile will produce a value [255,0] when read from 8 bit ADC data.

Subsequently, at 530, functionality 500 calculates a normalized profile. The normalized profile may be calculated by removing secondary and/or boundary ranges from the ADC data. For example, the calculated normalized profile of 530 may map each position of the user input device, excluding secondary and/or boundary positions, to an ADC value between 0 and 255.

In some instances, the resting position of the user input elements may vary at different times. For example, after use of the various user input devices, some of the user input devices may not return to the same resting position when the user interaction is removed. In such instances, functionality 500 may adjust the calculated profile and the calculated normalized profiles for such user input elements, at 540. Accordingly, the changed resting position(s) may be accounted for while monitoring the position of the user input elements.

FIG. 6 illustrates a controller that includes an outer spring 600 that creates an open extended travel range 620 for a trigger 610 to move within when trigger 610 is in a maximum open position outside of open extended travel range 620, according to an embodiment of the invention. More specifically, FIG. 6 illustrates a controller that includes outer spring 600 that holds trigger 610 in a maximum open position outside of open extended travel range 620. When a force is applied to trigger 610, outer spring 600 can allow trigger 610 to rotate, or otherwise move, to open extended travel range 620. FIG. 6 includes views 601 and 602. In view 601, trigger 610 is in a maximum open position outside of open extended travel range 620, as trigger 610 can be pulled or pushed along an axis that is perpendicular to the illustrated plane of FIG. 6. In view 602, trigger 610 is in a maximum open position that is inside open extended travel range 620, where trigger 610 is further extended within open extended travel range 620, as trigger 610 can be pulled back in, but cannot be pushed out further along an axis that is perpendicular to the illustrated plane of FIG. 6. In the illustrated embodiment, outer spring 600 is an example of a haptic diminishment prevention component, and is positioned between trigger 610 and an outer rotational hard stop, or an outer portion of a housing of the controller. A maximum open position outside of an extended travel range can be important for spatialization as a user can be lightly resting their fingers on triggers of a controller when receiving spatialization haptic effects. In order to increase a magnitude of a trigger haptic effect when a trigger (such as trigger 610) is in a maximum open position outside of an open extended travel range (such as open extended travel range 620), the trigger can be offset with an outer spring (such as outer spring 600) so that, when in the maximum open position outside of an open extended travel range, the trigger is able to move within the extended travel range in response to a force that is applied to the trigger.

View 601 is a view of the controller where outer spring 600 holds trigger 610 in a position such that trigger 610 is not resting at, or otherwise making contact with, an outer rotational hard stop, or an outer portion of a housing of the controller, when trigger 610 is in a maximum open position outside of open extended travel range 620. In other words, outer spring 600 creates open extended travel range 620, where open extended travel range 620 is a range that trigger 610 can rotate, or otherwise move, within, in response to a force that is produced by a targeted motor or actuator and applied to trigger 610. By creating open extended travel range 620, outer spring 600 can prevent trigger 610 from grounding on the outer rotational hard stop, or the outer portion of the housing, when trigger 610 rotates, or otherwise moves, in response to the force that is applied to trigger 610. This can increase a magnitude of a trigger haptic effect (e.g., kinesthetic haptic effect) experienced at trigger 610. In the illustrated embodiment, outer spring 600 is a cantilever spring that includes lever arm 605, where lever arm 605 pushes against, or otherwise makes contact with, trigger 610 to hold trigger 610 in the aforementioned position. In an alternate embodiment, outer spring 600 can be a compression spring, bias spring, or some other type of spring, that pushes against, or otherwise makes contact with, trigger 610. Although various spring types may be used, the embodiments are not so limited, and other deformation mechanisms may be used.

View 602 is a view of the controller where a targeted motor or actuator applies a force to trigger 610, and trigger 610 rotates, or otherwise moves, in response to the force. As illustrated in view 602 of FIG. 6, trigger 610 rotates, or otherwise moves, into open extended travel range 620, and occupies at least a portion of open extended travel range 620. In the illustrated embodiment, trigger 610 pushes against, or otherwise makes contact with, lever arm 605. This moves lever arm 605 so that trigger 610 can rotate, or otherwise move, into extended travel range 620. In an alternate embodiment where outer spring 600 is a compression spring, bias spring, or another type of spring, trigger 610 can push against, or otherwise make contact with, outer spring 600, which can move outer spring 600 so that trigger 610 can rotate, or otherwise move, into open extended travel range 620.

In an alternate embodiment, outer spring 600 can be replaced with an inner spring. The inner spring can be positioned between trigger 610 and an inner rotational hard stop, or an inner portion of a housing of the controller. Further, the inner spring can pull trigger 610 such that trigger 610 is not resting at, or otherwise making contact with, an outer rotational hard stop, or an outer portion of a housing of the controller (i.e., such that extended travel range 620 is created). In this alternate embodiment, a stiffness of inner spring can be calculated in order to avoid pulling trigger 610 so that trigger 610 is resting at, or otherwise making contact with, an inner rotational hard stop, or an inner portion of a housing of the controller.

FIG. 7 illustrates a controller that includes an extended frame 700 that creates a closed extended travel range 730 for a trigger 710 to move within when trigger 710 is in a maximum closed position outside of closed extended travel range 730, according to an embodiment of the invention. In the illustrated embodiment, extended frame 700 is an example of a haptic diminishment prevention component, and is an extension of an outer portion of a housing of the controller. As previously described, in a standard trigger design, a trigger haptic effect can be greatly diminished when a trigger (such as trigger 710) is a maximum closed position (e.g., when a user fully presses the trigger so that the trigger is grounded to an inner portion of a housing). In order to increase a magnitude of a trigger haptic effect when the trigger is in a maximum closed position outside of a closed extended travel range, an extended frame (such as extended frame 700) can be used as grounding for an object (such as object 720) that moves the trigger. In this situation, even when the trigger has fully moved to a maximum closed position outside of the closed extended travel range, the trigger can still move against the object and a significant haptic feedback sensation can be generated at the trigger.

FIG. 7 includes views 701 and 702. View 701 is a view of the controller where object 720 (e.g., a user's finger) has pushed, pulled, or otherwise moved trigger 710, and where object 720 is grounded (i.e., bottomed out) on extended frame 700. Because object 720 is grounded on extended frame 700, trigger 710 is not resting at, or otherwise making contact with, an inner rotational hard stop, or an inner portion of a housing of the controller, when trigger 710 is in a maximum closed position outside of closed extended travel range 730. In other words, extended frame 700 creates closed extended travel range 730, where closed extended travel range 730 is a range that trigger 710 can rotate, or otherwise move, within, in response to a force that is produced by a targeted motor or actuator and applied to trigger 710. By creating closed extended travel range 730, extended frame 700 can prevent trigger 710 from grounding on the inner rotational hard stop, or the inner portion of the housing, when trigger 710 rotates, or otherwise moves, in response to the force that is applied to trigger 710. This can increase a magnitude of a trigger haptic effect (e.g., kinesthetic haptic effect) experienced at trigger 710.

View 702 is a view of the controller where a targeted motor or actuator applies a force to trigger 710, and trigger 710 rotates, or otherwise moves, in response to the force. As illustrated in view 702 of FIG. 7, trigger 710 rotates, or otherwise moves, into closed extended travel range 730, and occupies at least a portion of closed extended travel range 730.

In an alternate embodiment, extended frame 700 can be replaced with an inner spring. The inner spring can be positioned between trigger 710 and an inner rotational hard stop, or an inner portion of a housing of the controller. Further, the inner spring can push trigger 710 where object 720 has pushed, pulled, or otherwise moved trigger 710 such that trigger 710 is not resting at, or otherwise making contact with, an inner rotational hard stop, or an inner portion of a housing of the controller (i.e., such that closed extended travel range 730 is created). In this alternate embodiment, a stiffness of inner spring can be calculated in order to provide sufficient resistance to prevent trigger 710 from resting at, or otherwise making contact with, an inner rotational hard stop, or an inner portion of a housing of the controller.

Figure 8:
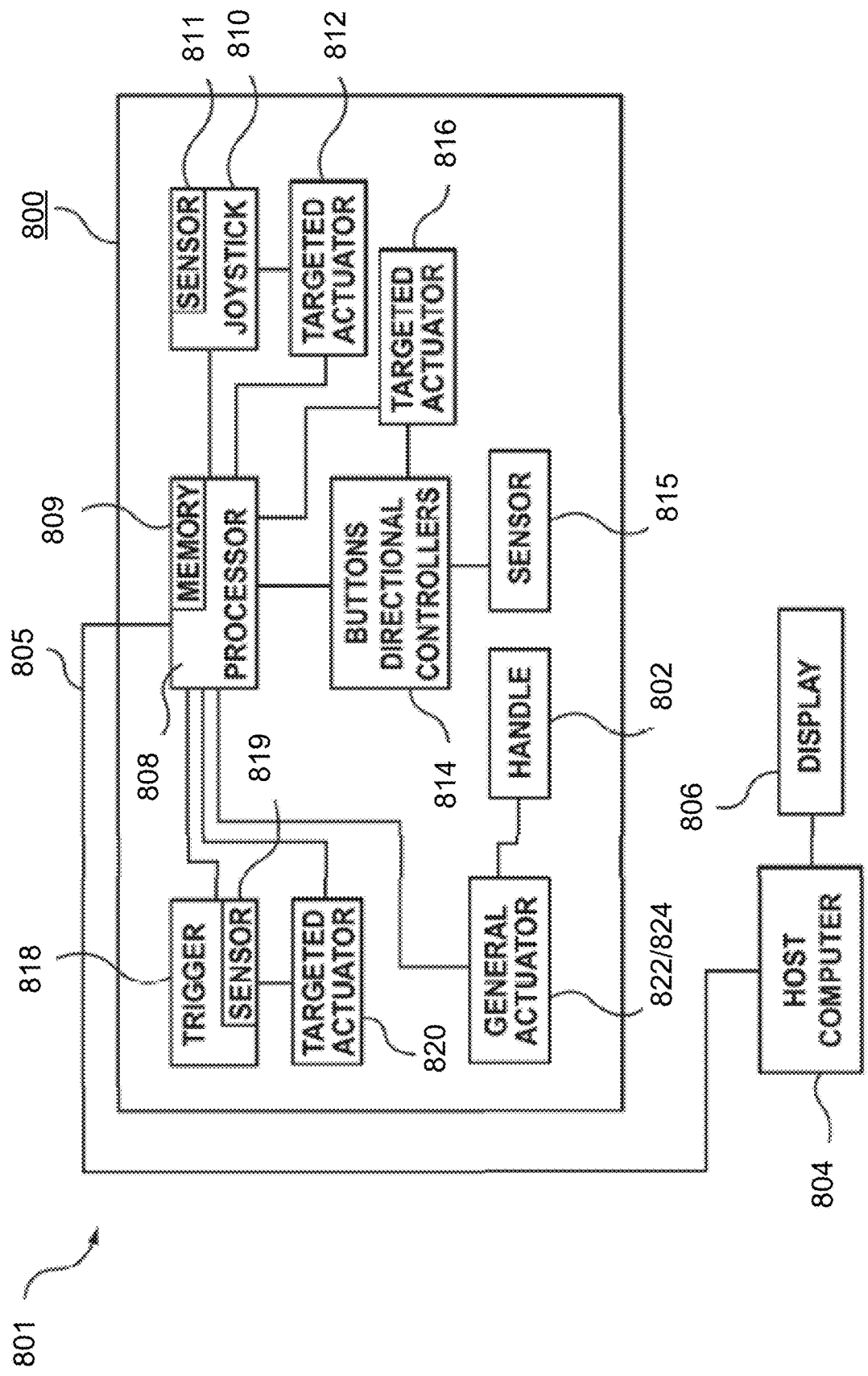
FIG. 8 illustrates a functional block diagram of a controller suitable for use with the embodiments of the present invention.

FIG. 8 illustrates a functional block diagram of a controller 800 suitable for use with the embodiments of the present invention.

As illustrated in FIG. 8, controller 800 may include one or more of a variety of user input elements. A user input element may refer to any interface device manipulated by the user to interact with host computer 804. Example user input elements include analog or digital joy stick 810, button 814, trigger 818, and the like. As understood by one of ordinary skill in the art, one or more of each user input element may be included on controller 800. For example, the present description of trigger 818 does not limit controller 800 to a single trigger. Similarly, those skilled in the art understand that multiple analog or digital sticks, buttons, and other user input elements may be used.

Controller 800 may include local processor 808. Local processor 808 may exchange commands and data with host computer 804 via connection 805. Connection 805 may be a wired or wireless connection using one or more communication protocols known to those skilled in the art. In some instances, controller 800 may be alternatively configured to not include local processor 808. Here, input/output signals from controller 800 may be handled and processed directly by host computer 804. Host computer 804 may be a gaming device console and display device 806 may be screen which is operably coupled to the gaming device console. In some instances, host computer 804 and display device 806 may be combined into a single device.

Controller 800 may include targeted actuators 812, 816, 820 (e.g., motors) to directly drive each of the user input elements thereof as well as one or more general or rumble actuators 822, 824 operably coupled to housing 802 in a location where a hand of the user is generally located. More particularly, analog or digital stick 810 includes a targeted actuator or motor 812 operably coupled thereto, button 814 includes a targeted actuator or motor 816 operably coupled thereto, and trigger 818 includes a targeted actuator or motor 820 operably coupled thereto. In addition to a plurality of targeted actuators, controller 800 includes a position sensor operably coupled to each of the user input elements thereof. More particularly, analog or digital stick 810 includes a position sensor 811 operably coupled thereto, button 814 includes a position sensor 815 operably coupled thereto, and trigger 818 includes a position sensor 819 operably coupled thereto. Local processor 808 is operably coupled to targeted actuators 812, 816, 820 as well as position sensors 811, 815, 819 of analog or digital stick 810, button 814, and trigger 818, respectively. In response to signals received from position sensors 811, 815, 819, local processor 808 instructs targeted actuators 812, 816, 820 to provide directed or targeted kinesthetic effects directly to analog or digital stick 810, button 814, and trigger 818, respectively. Such targeted kinesthetic effects are discernible or distinguishable from general or rumble haptic effects produced by general actuators 822, 824 along the entire body of the controller. The collective haptic effects provide the user with a greater sense of immersion to the game as multiple modalities are being simultaneously engaged (e.g., video, audio, and haptics).

Figure 9A:
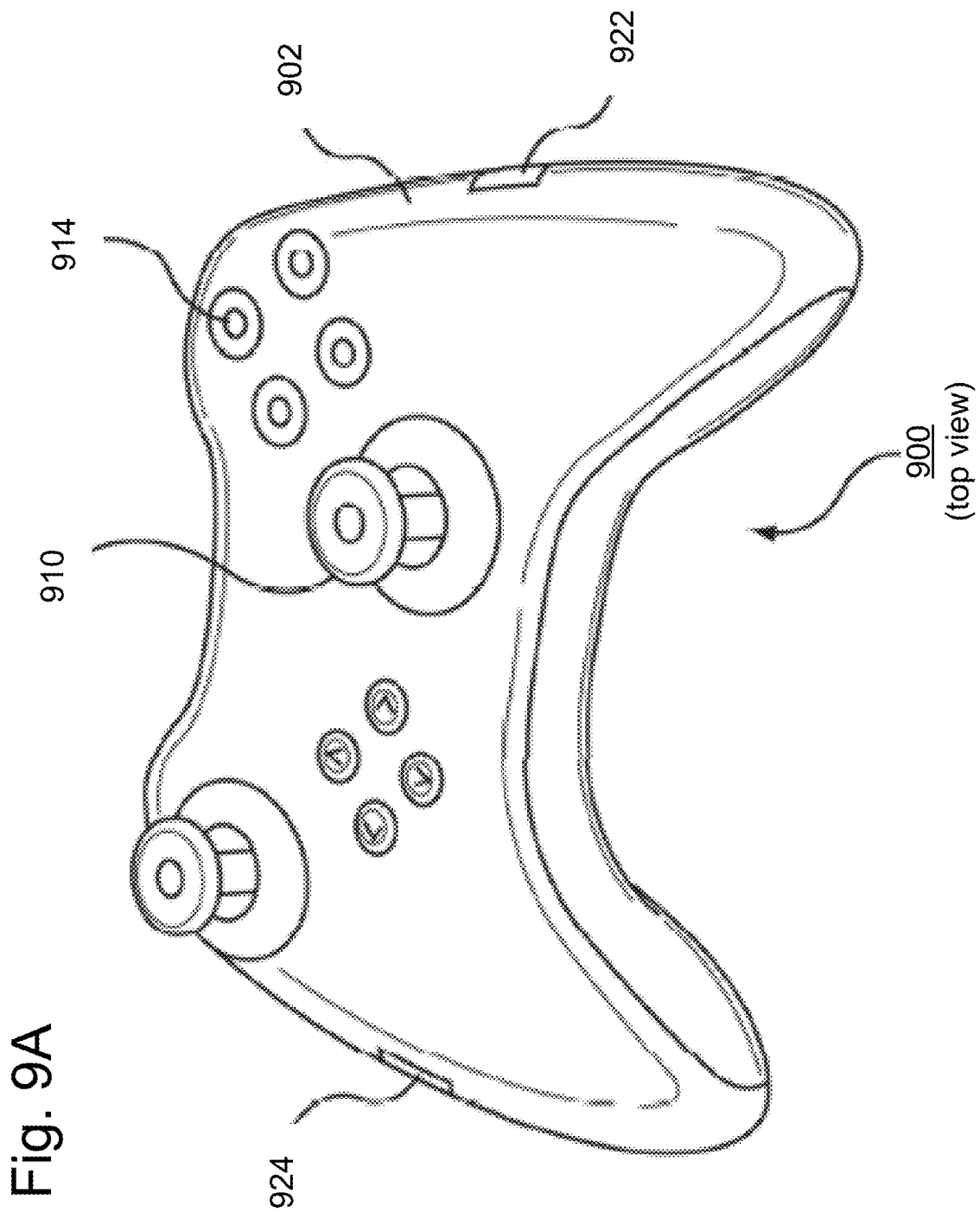
FIGS. 9A and 9B illustrate different views of a controller suitable for use with the embodiments of the present invention.
Figure 9B:
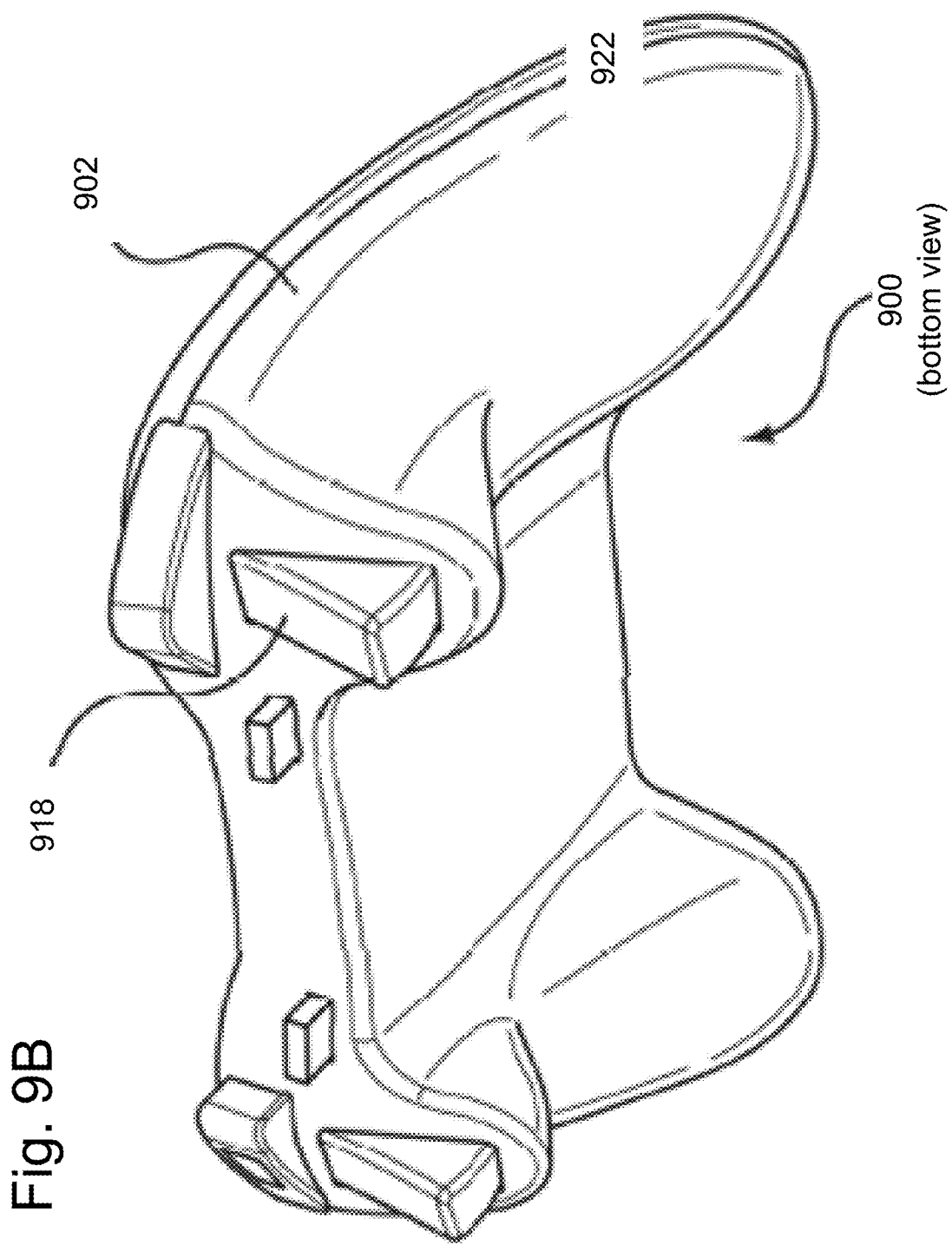

FIGS. 9A and 9B illustrate different views of a controller 900 suitable for use with the embodiments of the present invention. As shown in FIG. 9A and FIG. 9B, controller 900 may include a variety of components such as housing 902, analog or digital joy stick 910, button(s) 914, trigger 918, and rumble actuators 922 and 924.

Housing 902 is shaped to easily accommodate user gripping of controller 900. Controller 900 is an example embodiment of a controller, and the embodiments of the invention may be readily applied to other controller shapes.

Accordingly, the embodiments of the present invention extend the range and capabilities of user input elements. In addition, a wider range of haptic effects can be achieved by rendering the haptic effects at definable positions of the user input elements.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for controlling a user input element associated with a haptic output device, the method comprising:
defining position and range information for the user input element associated with the haptic output device, including a primary range of positions, a secondary range of positions, and a boundary range of positions, wherein the boundary range of positions partially overlaps each of the primary range of positions and the secondary range of positions; and
rendering a haptic effect in response to an entry of the user input element to one or more positions within the boundary range of positions.

2. The method of claim 1, wherein one of the primary range of positions, the secondary range of positions, and the boundary range of positions is calculated based on a movement of the user input element from a maximum out position to a grounding position.

3. The method of claim 1, wherein a profile for the user input element is calculated by mapping each position of the user input element to an analog to digital conversion value.

4. The method of claim 3, wherein the profile for the user input element is an increasing profile or a decreasing profile.

5. The method of claim 1, wherein a normalized profile for the user input element is calculated by removing at least one of the secondary range of positions or the boundary range of positions from mapped analog to digital conversion values.

6. The method of claim 1, further comprising monitoring a position of the user input element.

7. The method of claim 1, further comprising adjusting a profile and a normalized profile of the user input element to adjust for a change to a resting position of the user input element.

8. A non-transitory computer readable storage medium storing a program configured to be executed by a processor, the program comprising instructions for:
defining position and range information for a user input element associated with the haptic output device, including a primary range of positions, a secondary range of positions, and a boundary range of positions, wherein the boundary range of positions partially overlaps each of the primary range of positions and the secondary range of positions; and
rendering a haptic effect in response to an entry of the user input element to one or more positions within the boundary range of positions.

9. The non-transitory computer readable storage medium of claim 8, wherein one of the primary range of positions, the secondary range of positions, and the boundary range of positions is calculated based on a movement of the user input element from a maximum out position to a grounding position.

10. The non-transitory computer readable storage medium of claim 8, wherein a profile for the user input element is calculated by mapping each position of the user input element to an analog to digital conversion value.

11. The non-transitory computer readable storage medium of claim 10, wherein the profile for the user input element is an increasing profile or a decreasing profile.

12. The non-transitory computer readable storage medium of claim 8, wherein a normalized profile for the user input element is calculated by removing at least one of the secondary range of positions or the boundary range of positions from mapped analog to digital conversion values.

13. The non-transitory computer readable storage medium of claim 8, further comprising instructions for monitoring a position of the user input element.

14. The non-transitory computer readable storage medium of claim 13, further comprising instructions for adjusting a profile and a normalized profile of the user input element to adjust for a change to a resting position of the user input element.

15. A device comprising:
a processor; and
a memory storing a program for execution by the processor, the program including instructions for:
defining position and range information for a user input element associated with the haptic output device, including a primary range of positions, a secondary range of positions, and a boundary range of positions, wherein the boundary range of positions partially overlaps each of the primary range of positions and the secondary range of positions; and rendering a haptic effect in response to an entry of the user input element to one or more positions within the boundary range of positions.

16. The device of claim 15, wherein one of the primary range of positions, the secondary range of positions, and the boundary range of positions is calculated based on a movement of the user input element from a maximum out position to a grounding position.

17. The device of claim 15, wherein a profile for the user input element is calculated by mapping each position of the user input element to an analog to digital conversion value.

18. The device of claim 15, wherein a normalized profile for the user input element is calculated by removing at least one of the secondary range of positions or the boundary range of positions from mapped analog to digital conversion values.

19. The device of claim 15, further comprising instructions for monitoring a position of the user input element.

20. The device of claim 19, further comprising instructions for adjusting a profile and a normalized profile of the user input element to adjust for a change to a resting position of the user input element.

* * * * *

(12) INTER PARTES REVIEW CERTIFICATE (4240th)

United States Patent
Venkatesan et al.

(10) Number: US 10,627,907 K1
(45) Certificate Issued: Jan. 26, 2026

(54) POSITION CONTROL OF A USER INPUT ELEMENT ASSOCIATED WITH A HAPTIC OUTPUT DEVICE

(71) Applicants: Srivatsav Venkatesan; Kaniyalal Shah; Douglas George Billington; Aaron Kapelus; Stephen Rank; Daniel Parker

(72) Inventors: Srivatsav Venkatesan; Kaniyalal Shah; Douglas George Billington; Aaron Kapelus; Stephen Rank; Daniel Parker

(73) Assignee: IMMERSION CORPORATION

Trial Number:

IPR2024-00714 filed Mar. 22, 2024

Inter Partes Review Certificate for:

Patent No.: 10,627,907
Issued: Apr. 21, 2020
Appl. No.: 16/058,399
Filed: Aug. 8, 2018

The results of IPR2024-00714 are reflected in this inter partes review certificate under 35 U.S.C. 318(b).

INTER PARTES REVIEW CERTIFICATE
U.S. Patent 10,627,907 K1
Trial No. IPR2024-00714
Certificate Issued Jan. 26, 2026

AS A RESULT OF THE INTER PARTES REVIEW PROCEEDING, IT HAS BEEN DETERMINED THAT:

Claims 1-20 are cancelled.

\* \* \* \* \*